(12) United States Patent
Bloch et al.

(10) Patent No.: US 8,861,347 B2
(45) Date of Patent: Oct. 14, 2014

(54) CONFIGURABLE ACCESS CONTROL LISTS USING TCAM

(75) Inventors: Gil Bloch, Zichron Yaakov (IL); Itamar Rabenstein, Petach Tikva (IL); Miriam Menes, Tel Aviv (IL); Ido Bukspan, Herzliya (IL)

(73) Assignee: Mellanox Technologies Ltd., Yokneam (IL)

( * ) Notice: Subject to any disclaimer, the term of this patent is extended or adjusted under 35 U.S.C. 154(b) by 209 days.

(21) Appl. No.: 13/310,758

(22) Filed: Dec. 4, 2011

(65) Prior Publication Data

US 2013/0142039 A1 Jun. 6, 2013

(51) Int. Cl.
| | |
|---|---|
| H04J 1/16 | (2006.01) |
| H04L 1/00 | (2006.01) |
| H04L 12/26 | (2006.01) |
| H04L 12/28 | (2006.01) |
| G06F 13/00 | (2006.01) |

(52) U.S. Cl.
USPC .......... 370/230; 370/252; 370/392; 370/412; 709/223; 709/224; 709/225; 711/108

(58) Field of Classification Search
USPC ............. 726/3, 22; 370/252, 392, 401, 412; 711/108; 707/9; 709/223–225
See application file for complete search history.

(56) References Cited

U.S. PATENT DOCUMENTS

| | | | | |
|---|---|---|---|---|
| 6,651,096 B1* | 11/2003 | Gai et al. | ....................... | 709/223 |
| 7,024,515 B1* | 4/2006 | Ruan et al. | ..................... | 711/108 |
| 7,133,914 B1* | 11/2006 | Holbrook | ...................... | 709/224 |
| 7,933,282 B1* | 4/2011 | Gupta et al. | ................... | 370/412 |
| 2005/0021752 A1* | 1/2005 | Marimuthu et al. | .......... | 709/225 |
| 2006/0294297 A1* | 12/2006 | Gupta | ........................... | 711/108 |
| 2008/0165778 A1* | 7/2008 | Ertemalp | ....................... | 370/392 |
| 2008/0235234 A1* | 9/2008 | Beedubail et al. | ................ | 707/9 |
| 2009/0259811 A1* | 10/2009 | Krishnan | ....................... | 711/108 |
| 2009/0300759 A1* | 12/2009 | Wang et al. | ...................... | 726/22 |
| 2009/0310504 A1* | 12/2009 | Engbersen et al. | ........... | 370/252 |

OTHER PUBLICATIONS

Meiners et al., "Algorithmic Approaches to Redesigning TCAM-Based Systems", Proceedings of the 2008 ACM SIGMETRICS International Conference on Measurement and Modeling of Computer Systems, vol. 36, issue 1, pp. 467-468, Annapolis, USA, Jun. 2-6, 2008.

Meiners et al., "TCAM SPliT: Optimizing Space, Power, and Throughput for TCAM-based Packet Classification Systems", Technical Report MSU-CSE-09-18, Michigan State University, USA, Apr. 2009.

* cited by examiner

*Primary Examiner* — Jung Park
*Assistant Examiner* — Chuong M Nguyen
(74) *Attorney, Agent, or Firm* — D. Kligler I.P. Services Ltd.

(57) ABSTRACT

A communication apparatus includes a Content-Addressable Memory (CAM) and packet processing circuitry. The packet processing circuitry is configured to store in respective regions of the CAM multiple Access Control Lists (ACLs) that are defined for respective packet types, to classify an input packet to a respective packet type selected from the packet types, to identify a region holding an ACL defined for the selected packet type, and to process the input packet in accordance with the ACL stored in the identified region.

18 Claims, 4 Drawing Sheets

… (1)

CONFIGURABLE ACCESS CONTROL LISTS USING TCAM

FIELD OF THE INVENTION

The present invention relates generally to computer communication, and particularly to methods and systems for packet processing.

BACKGROUND OF THE INVENTION

Some network elements perform packet classification and processing using Ternary Content-Addressable Memory (TCAM). TCAM-based packet processing is described, for example, by Meiners et al., in "Algorithmic Approaches to Redesigning TCAM-Based Systems," SIGMETRICS 2008, Annapolis, Md., Jun. 2-6, 2008, which is incorporated herein by reference. The paper describes various techniques for reducing the number of TCAM bits used for representing a packet classifier. Similar techniques are also described by Meiners et al., in "TCAM SPliT: Optimizing Space, Power, and Throughput for TCAM-based Packet Classification Systems," Technical Report MSU-CSE-09-18, Michigan State University, April, 2009, which is incorporated herein by reference.

SUMMARY OF THE INVENTION

An embodiment of the present invention that is described herein provides a communication apparatus including a Content-Addressable Memory (CAM) and packet processing circuitry. The packet processing circuitry is configured to store in respective regions of the CAM multiple Access Control Lists (ACLs) that are defined for respective packet types, to classify an input packet to a respective packet type selected from the packet types, to identify a region holding an ACL defined for the selected packet type, and to process the input packet in accordance with the ACL stored in the identified region.

In some embodiments, the CAM includes a Ternary CAM (TCAM). In an embodiment, the packet processing circuitry is configured to store in a data structure external to the CAM respective entries that point to the regions defined for the packet types, and to identify the region holding the ACL defined for the selected packet type by querying an entry of the data structure corresponding to the selected packet type. In a disclosed embodiment, the packet processing circuitry is configured to configure the data structure or the CAM to apply two or more of the ACLs in cascade to selected communication packets.

In another embodiment, the packet processing circuitry is configured to apply a first ACL followed by a second ACL by defining in a first entry of the data structure, which points to the first ACL, an indication pointing to a second entry of the data structure, which points to the second ACL. In yet another embodiment, the packet processing circuitry is configured to apply a first ACL followed by a second ACL by causing at least one rule in the first ACL, stored in the CAM, to specify application of the second ACL.

In some embodiments, the number of ACLs in the cascade is unbounded. In some embodiments, the cascade of the two or more ACLs is user-configurable. In an embodiment, the packet processing circuitry is configured to configure the data structure or the CAM to refrain from applying any of the ACLs to selected communication packets.

In some embodiments, the packet processing circuitry is configured to receive the input packet over a given ingress port, and the multiple ACLs are associated with the ingress port. In alternative embodiments, the input packet is associated with a given Virtual Local Area Network (VLAN), and the multiple ACLs are associated with the VLAN. In an embodiment, the packet processing circuitry is configured to access first and second ACLs defined respectively for first and second packet types using respective first and second keys having different lengths. In another embodiment, the packet processing circuitry is configured to access first and second ACLs defined respectively for first and second packet types using respective first and second keys of the same length.

There is additionally provided, in accordance with an embodiment of the present invention, a communication apparatus including a Content-Addressable Memory (CAM) and packet processing circuitry. The packet processing circuitry is configured to store in respective regions of the CAM multiple Access Control Lists (ACLs) that define rules for application to communication packets, to maintain a data structure that defines a sequence of two or more of the ACLs that are to be applied in cascade to a selected subset of the communication packets, and to apply the sequence of the ACLs to the selected subset of the communication packets in accordance with the data structure.

There is also provided, in accordance with an embodiment of the present invention, a method for communication. The method includes storing in respective regions of a Content-Addressable Memory (CAM) multiple Access Control Lists (ACLs) that are defined for respective packet types. An input packet is classified to a respective packet type selected from the packet types. A region holding an ACL defined for the selected packet type is identified, and the input packet is processed in accordance with the ACL stored in the identified region.

There is further provided, in accordance with an embodiment of the present invention, a method for communication. The method includes storing in multiple regions of a Content-Addressable Memory (CAM) respective Access Control Lists (ACLs) that define rules for application to communication packets. A data structure defining a sequence of two or more of the ACLs, which are to be applied in cascade to a selected subset of the communication packets, is maintained. The sequence of the ACLs is applied to the selected subset of the communication packets in accordance with the data structure.

The present invention will be more fully understood from the following detailed description of the embodiments thereof, taken together with the drawings in which:

DETAILED DESCRIPTION OF EMBODIMENTS

Overview

Figure 1:
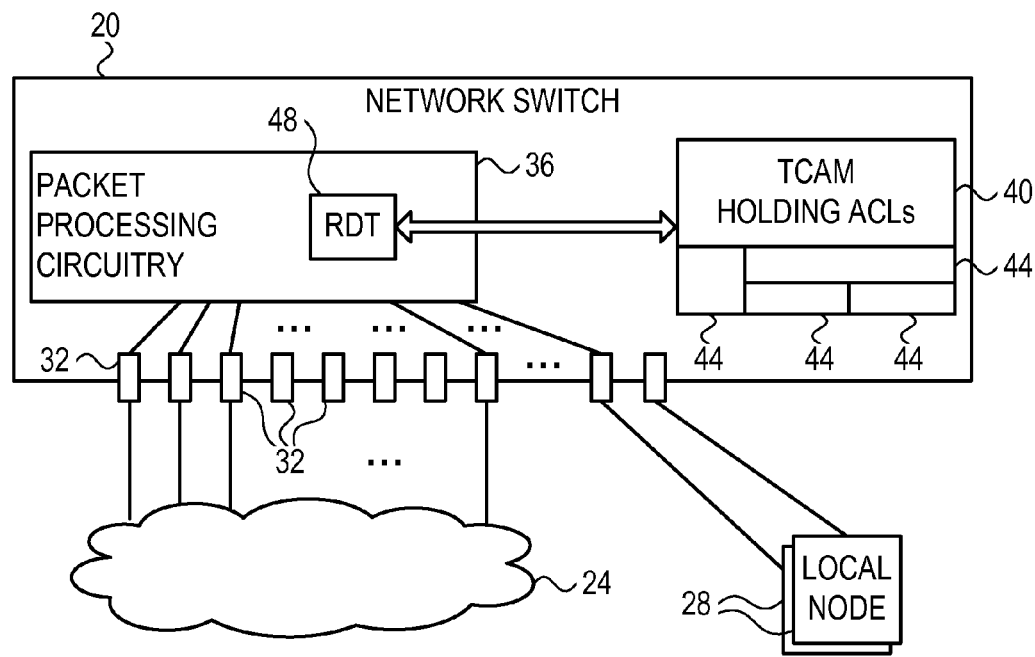
FIG. 1 is a block diagram that schematically illustrates a network switch that applies TCAM-based packet processing, in accordance with an embodiment of the present invention.

Content-Addressable Memory (CAM) is a type of memory that is queried by a content word, and returns an address in which the content word is found. Ternary CAM is a particular kind of CAM that searches for matches to the desired content word while disregarding a specified set of bits, i.e., permitting a specified set of "don't care" bits. TCAM can be used, for example, in network switches and other network elements for implementing Access Control Lists (ACLs) that define rules for application to communication packets.

In an implementation of this sort, the TCAM holds an ACL having multiple entries. Each entry comprises a set of packet attribute values, expressed as a string of bits having respective values "1", "0" or "X" (don't care), and a corresponding action (e.g., whether to permit or deny forwarding of the packet). When processing a given packet, the TCAM is queried with a "key"—a bit string corresponding to a set of attribute values of the processed packet. The key may comprise fields extracted from the packet header and/or payload, as well as auxiliary information regarding the packet such as the ingress port over which the packet is received. The TCAM attempts to find an ACL entry that matches the key and, once a matching ACL entry is found, the action specified in this entry is applied to the packet.

Embodiments of the present invention that are described hereinbelow provide improved methods and systems for processing communication packets using CAM lookup. Although the embodiments described herein refer mainly to TCAM, the disclosed techniques can be used with other kinds of CAM, such as binary CAM.

In some embodiments, a network switch comprises multiple ports and packet processing circuitry that forwards communication packets between the ports. The switch comprises a TCAM, in which the circuitry stores multiple ACLs for application to the packets. Each ACL is stored in a respective region in the TCAM, which may be identified by certain row and/or column coordinates by any other suitable means.

In some disclosed embodiments, different ACLs are stored in the TCAM for different, respective packet types. When processing a packet entering the switch via a given port, the circuitry identifies the type of the packet, and applies the ACL corresponding to the identified packet type to the packet. Several examples of packet type classifications are described below.

Although it is possible in principle to process all packets using a single ACL regardless of packet type, such a solution requires the single ACL to have columns corresponding to packet attributes of all packet types. To accommodate the rules for a variety of different packet types, the ACL would in many cases have to occupy a large number of columns in the TCAM and would require a long key. The use of separate ACLs for different packet types reduces the size of the key and the number of columns in each type-specific ACL. The total memory required in the TCAM is reduced significantly, even though multiple ACLs are stored instead of a single ACL. This memory saving can be exploited, for example, in increasing the number of rules or the number of ACLs for a given TCAM size, or in reducing the size, cost and power consumption of the TCAM.

In some embodiments, the packet processing circuitry of the switch comprises a configurable data structure (referred to herein as a Region Description Table—RDT) that is external to the TCAM and holds pointers to the various TCAM regions holding the ACLs. When processing a given packet, the circuitry queries the RDT with the identified packet type, so as to obtain a pointer to the TCAM region holding the ACL defined for the packet type in question. The circuitry then applies the ACL stored in that region to the packet.

In some embodiments, the data structure (in the present example the RDT) defines cascading of ACLs, i.e., applying sequences of two or more ACLs to selected packets. As will be explained in detail hereinbelow, by proper configuration of the RDT, the packet processing circuitry is able to define various schemes for cascading ACLs. In some embodiments, different ACL sequences are defined for different packet types. In other disclosed embodiments, cascading of ACLs is implemented using the ACL rules stored in the TCAM. In an example embodiment, a given ACL entry in the TCAM may specify that the applicable action is to apply another ACL to the packet.

The disclosed ACL cascading mechanisms are flexible and configurable by the packet processing circuitry, and thus by the switch user. These mechanisms do not impose limits on the number of ACLs in each cascade, meaning that the number of ACL lookups is user-configurable. Moreover, the disclosed techniques permit defining different cascading schemes for different packet types or flows. As a result, TCAM resources are used with high efficiency, meaning that a TCAM of a given size may store a higher number of rules, or that a given number of rules can be implemented in a smaller TCAM while reducing size, cost and power consumption.

Since the disclosed mechanisms enable tailoring of the ACL cascading per packet type or even per flow, ACL processing is applied only selectively to some of the flows, and computational complexity is therefore improved. Moreover, the disclosed techniques enable applications that are not feasible otherwise—applications in which the number of ACL lookups is not fixed or predetermined, e.g., varies depending on the packet content.

System Description

FIG. 1 is a block diagram that schematically illustrates a network switch 20 that applies TCAM-based packet processing, in accordance with an embodiment of the present invention. Switch 20 is connected to a computer network 24 and/or to one or more local compute nodes (clients) 28. The switch comprises multiple ports for connecting to network 24 and local nodes 28. In the present example, switch 20 comprises an Ethernet switch and network 24 comprises an Ethernet network. In alternative embodiments, however, the disclosed techniques can be implemented in other kinds of network elements such as routers or bridges. The network element and network may operate in accordance with any other suitable communication standard or protocol, such as InfiniBand (IB).

Switch 20 accepts communication packets from network 24 and/or nodes 28 over ports 32, and forwards each packet to a certain port 32 en-route to its destination. The port over which a given packet enters the switch is referred to as an ingress port, and the port over which a given packet leaves the switch is referred to as an egress port.

In the example of FIG. 1, switch 20 comprises packet processing circuitry 36, which performs forwarding of packets between ports 32. Typically, when processing an incoming packet, circuitry 36 enforces a set of rules applicable to the packet. The rules are typically defined over certain packet attributes and specify actions that are to be performed on the packet. The rules may relate, for example, to security privileges. The applicable actions may be, for example, to discard the packet, to permit forwarding of the packet, or to apply a certain Quality of service (QoS) to the packet. Other applicable actions may comprise various routing actions, policing actions, metering actions, or any other suitable action type.

In some embodiments, switch 20 stores the rules in one or more Access Control Lists (ACLs) that is queried by circuitry 36. An ACL typically comprises multiple entries. Each entry comprises a set of packet attributes and an applicable action. Circuitry 36 checks the attributes of each incoming packet against the applicable ACL or ACLs, and attempts to find a matching entry. If a match is found, the switch applies the action specified in the matching entry (e.g., discard or forward) to the packet.

In some configurations, each ingress port is associated with a respective ingress ACL, meaning that circuitry 36 processes the packets entering over a given port according to the ingress ACL associated with this port. In some cases an ingress ACL is associated with a group of ports. Additionally or alternatively, each egress port is associated with a respective egress ACL, meaning that circuitry 36 processes the packets destined to a given egress port according to the egress ACL associated with this port. In some cases an egress ACL is associated with a group of ports.

Further additionally or alternatively, ACLs are defined per Virtual Local Area Network (VLAN) or group of VLANs, meaning that circuitry 36 processes the packets belonging to a certain VLAN according to the ACL associated with this VLAN. Thus, in some cases a packet may be processed using multiple ACLs (e.g., ingress, egress, port and VLAN). Both port and VLAN ACLs may comprise either ingress or egress ACLs.

In some embodiments, switch 20 stores the ACLs in a Content Addressable Memory (CAM), in the present example a Ternary CAM (TCAM) 40. Circuitry 36 searches for a match in a given ACL by querying the ACL with a bit string corresponding to a set of packet attributes, referred to as a key. The TCAM identifies an ACL entry that matches the key and may return the index of that entry, the applicable action and/or a pointer to another table that holds the applicable action. The TCAM entries may also define one or more "don't care" bits that are to be ignored in the TCAM matching process.

In some embodiments, TCAM 40 is divided into multiple memory regions 44 that hold respective ACLs. Each region 44 is defined as a range that occupies the intersection of a certain set of rows and a certain set of columns in the TCAM. The length (number of rows) and width (number of columns) may differ from one region to another, thus enabling the use of ACLs having various numbers of entries (corresponding to the ACL rows) and various key lengths (packet attributes that correspond to ACL columns).

In some embodiments, packet processing circuitry 36 comprises a Region Description Table (RDT) 48, which is external to TCAM 40 and is used by circuitry 36 for accessing the ACLs stored in the TCAM. The use of the ACLs and the functions of RDT 48 are described in detail further below.

Figure 2:
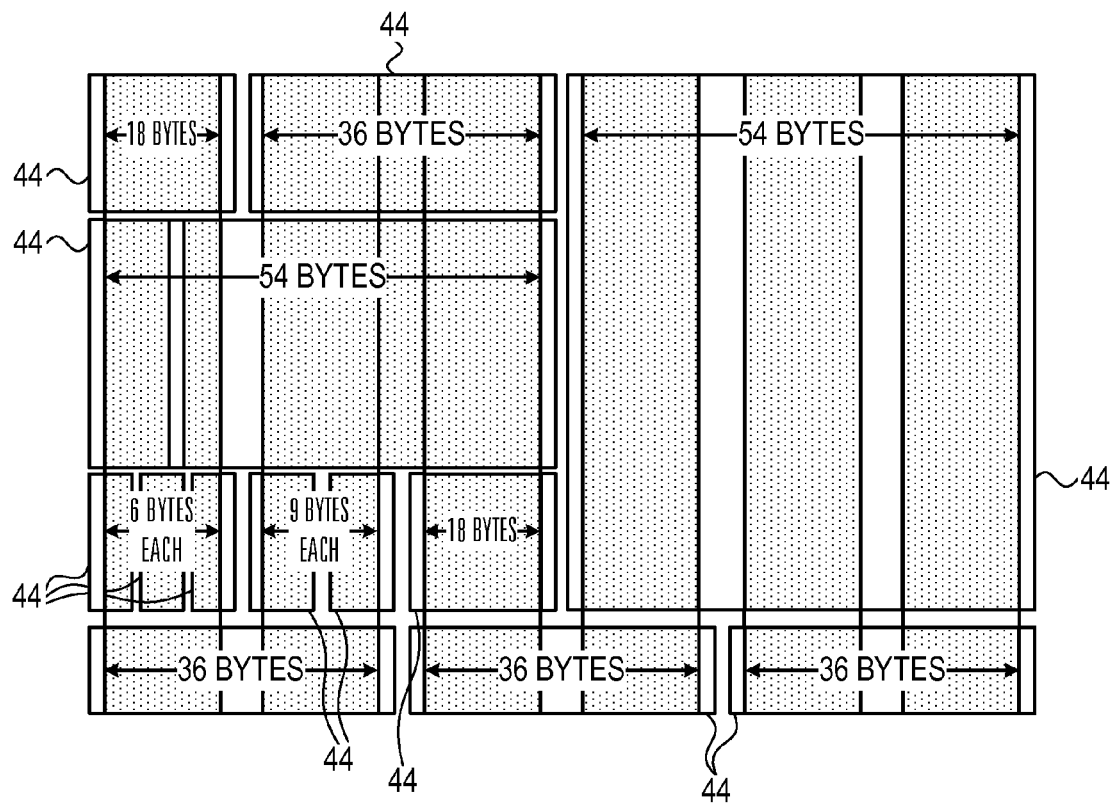
FIG. 2 is a diagram that schematically illustrates memory regions in a TCAM that hold Access Control Lists (ACLs), in accordance with an embodiment of the present invention.

FIG. 2 is a diagram that schematically illustrates memory regions 44 in TCAM 40 that hold ACLs, in accordance with an embodiment of the present invention. In the present example, TCAM 40 comprises thirty TCAM arrays or banks, each array having 512 rows, each row having a width of eighteen bytes. The TCAM arrays can be augmented to reach a maximum width of fifty-four bytes per row. In the configuration of FIG. 2, TCAM 40 is divided into thirteen regions 44 that hold thirteen respective ACLs. As can be seen in the figure, the ACLs have various widths ranging from six bytes to fifty-four bytes, and various lengths (numbers of rows). The TCAM configuration of FIG. 2 is shown purely by way of example. In alternative embodiments, TCAM 40 may have any other suitable size or structure, and may be divided into any suitable number of regions of any suitable dimensions.

The configuration of switch 20 shown in FIG. 1 is an example configuration, which is chosen purely for the sake of conceptual clarity. In alternative embodiments, any other suitable switch configuration can be used. Some elements of switch 20 may be implemented in hardware, e.g., in one or more Application-Specific Integrated Circuits (ASICs) or Field-Programmable Gate Arrays (FPGAs). Additionally or alternatively, some switch elements can be implemented using software, or using a combination of hardware and software elements.

In some embodiments, some of the functions of circuitry 36 may be carried out by a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Selecting the Applicable ACL Based on Packet Type

The packets processed by switch 20 may be of various packet types. For example, some packets may comprise Internet Protocol (IP) packets, other packets may comprise non-IP packets, and other packets may comprise Fibre-Channel over Ethernet (FCoETH) packets. Other types of packets may comprise, for example, Ethernet packets, Infiniband packets, Fibre Channel (FC) packets, Ethernet over Infiniband (EoIB) packets or Transparent Interconnection of Lots of Links (TRILL) packets. As another example, some packets may comprise unicast packets, i.e., packets that are addressed to a single recipient, while other packets may comprise multicast packets that are addressed to multiple recipients. These examples refer to layer-2 (L2) classification of the packets.

Additionally or alternatively, packets may be classified to different types using layer-2 (L2), unicast, multicast, or layer-3 (L3) classification, e.g., IPv4, IPv6, ARP and IMCP may be regarded as different packet types.

Additionally or alternatively, packets may be classified to different types using layer-4 (L4) classification. For example, Transmission Control Protocol (TCP) packets, User Datagram Protocol (UDP) packets, Infinibad, CR-space-1 and CR-space-2 may be regarded as different types. As yet another example, packets may be classified to types based on the application they serve. In each kind of classification, a certain type may indicate NONE or UNKNOWN type. Further alternatively, the packets processed by switch 20 may be classified to any other suitable type. In some cases a packet may belong to more than one type, e.g., a multicast IP packet. In the present context, different VLAN tags per-se are not considered different packet types.

In some embodiments, circuitry 36 processes packets of different types using different respective ACLs. In other words, circuitry 36 selects the ACL for processing an incoming packet based on the type to which this packet belongs. In an example implementation, TCAM 40 holds multiple ACLs corresponding to multiple respective packet types. RDT 48 holds, for each packet type, a respective entry that points to the region 44 (and thus to the ACL) corresponding to that packet type. When processing a given input packet, circuitry 36 determines the type of the packet and queries RDT 48 to determine the region holding the appropriate ACL. Then, circuitry 36 processes the packet using the ACL found in that region. In some embodiments, the above-described configuration is implemented per ingress port or port group.

Figure 3:
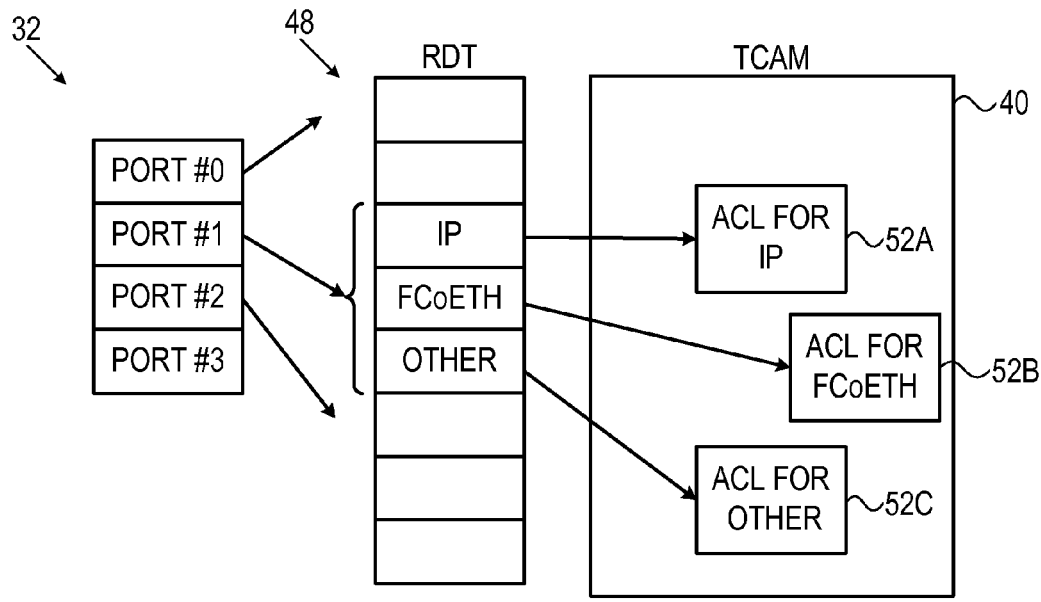
FIG. 3 is a diagram that schematically illustrates a TCAM-based packet processing method, in accordance with an embodiment of the present invention.

FIG. 3 is a diagram that schematically illustrates a TCAM-based packet processing method, in accordance with an embodiment of the present invention. The figure shows the process that circuitry 36 applies to packets entering the switch at port #1. In the present example, three packet types are considered—IP, FCoETH and OTHER. RDT 48 holds three entries for port #1, one entry per packet type. TCAM 40 holds three ACLs denoted 52A . . . 52C, which specify the rules to be applied to IP, FCoETH and OTHER packets entering at port #1, respectively. The three ACLs may be of different sizes and may be stored in any suitable regions of the TCAM.

When a packet enters the switch at port #1, circuitry 36 classifies the packet so as to determine the packet type. Circuitry 36 then queries the entry in RDT that corresponds to that packet type. The entry indicates the location in TCAM 40 of the region holding the ACL corresponding to that packet type. Circuitry 36 processes the packet in accordance with the ACL stored in this region, i.e., either ACL 52A, 52B or 52C.

Although it is possible in principle to process all packet types using a single ACL, such a configuration would require the single ACL to have columns corresponding to packet attributes of all packet types. The ACL in this solution would be extremely wide (large number of columns in TCAM 40), and would require a long key.

The use of separate ACLs for different packet types reduces the width of the key, and therefore the width of the ACLs, considerably. Significant saving in the required memory size can be achieved in this manner. This saving can be used, for example, for increasing the number of rules (ACL entries), increasing the number of ACLs, or reducing the size and cost of TCAM 40.

The example of FIG. 1 refers to port #1. Typically, circuitry 36 implements a similar configuration in RDT 48 per ingress port or per group of ingress ports. In other words, circuitry 36 stores in TCAM 40 multiple ACLs for multiple respective packet types per ingress port or port group. Circuitry 36 also stores, per each egress port or egress port group, a set of entries in RDT 48 corresponding to the multiple respective packet types. Circuitry 36 processes each incoming packet using the ACL that is pointed to by the RDT entry corresponding to the ingress port and packet type.

In the examples above, circuitry 36 applies different ACLs for different packet types per ingress port or per group of ingress ports. In alternative embodiments, circuitry 36 may apply different ACLs for different packet types per VLAN or group of VLANs. Such configurations are applicable to the schemes of FIGS. 4, 5 and 7 below, as well.

Cascading Multiple ACLs

In some embodiments, circuitry 36 configures RDT 48 to allow cascading of multiple ACLs, i.e., to apply the rules of multiple ACLs to the same packet.

Figure 4:
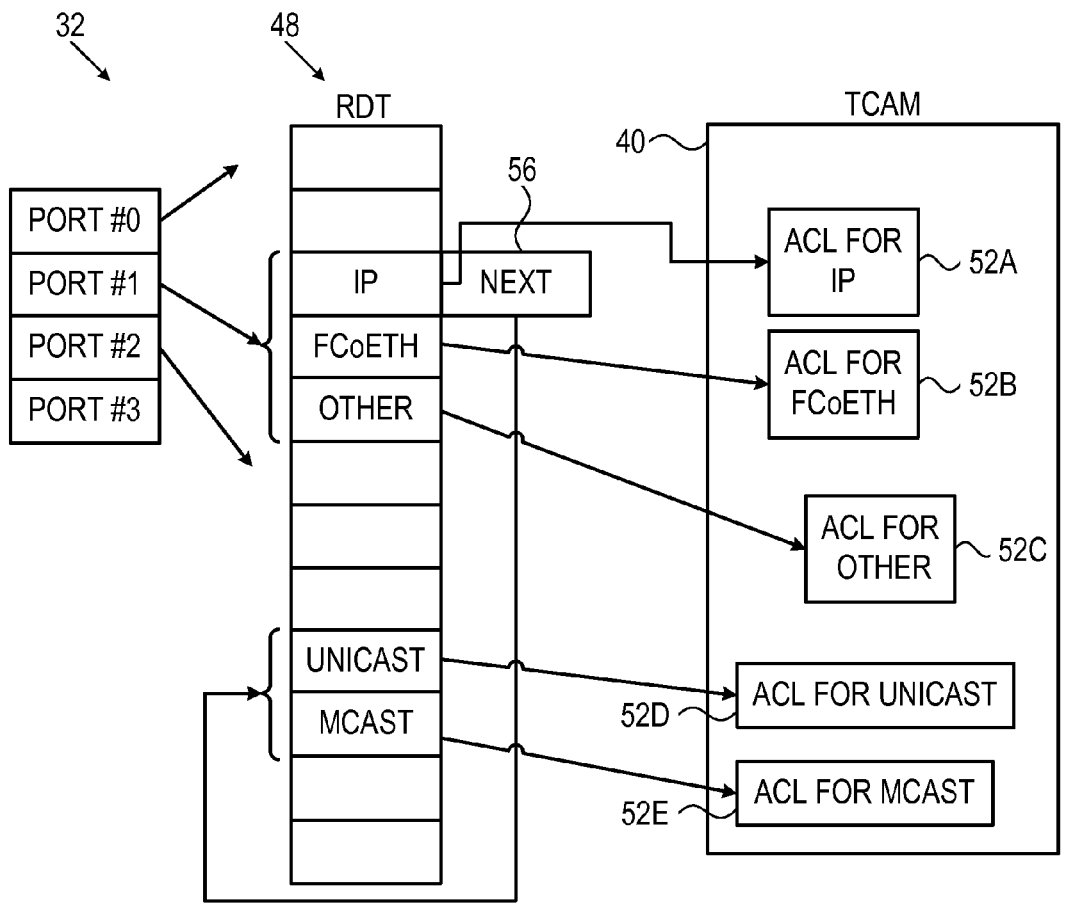
FIGS. 4 and 5 are diagrams that schematically illustrate method for cascading ACLs, in accordance with an embodiment of the present invention.

FIG. 4 is a diagram that schematically illustrates a method for cascading ACLs, in accordance with an embodiment of the present invention. In this example, in addition to the ACLs and RDT entries of FIG. 3 above, circuitry 36 stores in TCAM 40 an ACL 52D that defines rules applicable to unicast packets, and an ACL 52E that defines rules applicable to multicast packets. Circuitry stores in RDT 48 entries that point to ACLs 52D and 52E.

In addition, the RDT entry of port #1 corresponding to IP packets comprises a NEXT field 56. The NEXT field points to the RDT entries that point to ACLs 52D and 52E. Upon encountering a NEXT field in a given RDT entry, circuitry 36 first applies the ACL that is pointed to by the RDT entry, and then jumps to the RDT entry that is pointed to by the NEXT field. In the present example, an IP packet entering at port #1 will first be processed according to ACL 52A. Then, the IP packet will be processed according to ACL 52D if the packet is a unicast packet, and according to ACL 52E if the packet is a multicast packet. FCoE and OTHER packets, on the other hand, will only be processed according to ACLs 52B and 52C, respectively, because their RDT entries to not have a NEXT field.

In some embodiments, all RDT entries have a NEXT field, and a NEXT field value of NULL indicates that no more ACL lookups are to be performed.

The example of FIG. 4 demonstrates cascading of two ACLs—applying an IP/FCoE/OTHER ACL followed by a unicast/multicast ACL. This cascading process may be repeated more than once. Therefore, by proper configuration of RDT 48, the disclosed technique enables cascading of any desired number of ACL lookups.

Figure 5:
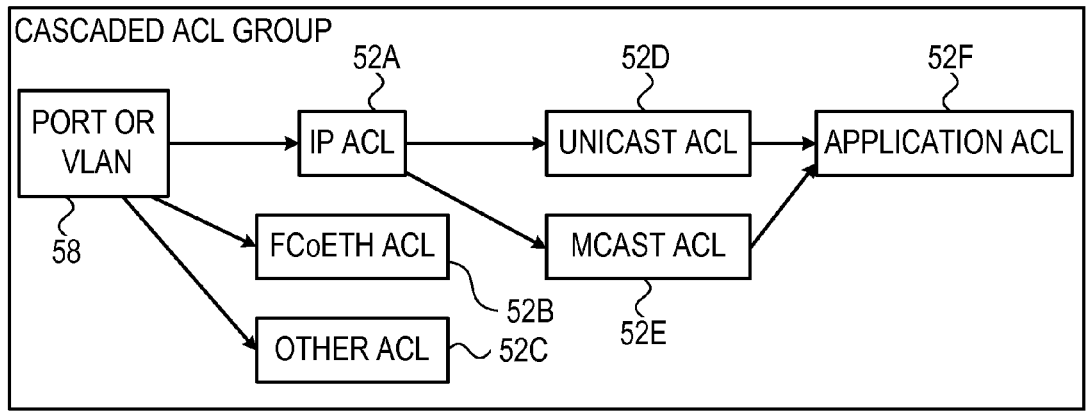

FIG. 5 is a diagram that schematically illustrates a method for cascading ACLs, in accordance with an embodiment of the present invention. This example demonstrates the ACL cascading mechanism from the perspective of the user (e.g., network administrator). In some embodiments, the user is provided with a user interface that allows him to configure switch 20 to perform various ACL cascading schemes. The example of FIG. 5 shows an ACL group that applies to a certain port or port group, or alternatively to a certain VLAN. A packet entering the switch at this port, or a packet associated with this VLAN, is first processed with an ingress ACL 58. Then, the packet is processed with either ACL 52A, 52B or 52D, depending on whether the packet is an IP, FCoE or OTHER packet, respectively. FCoE and OTHER packets are not subjected to additional ACLs. An IP packet, on the other hand, is subsequently processed using either ACL 52D or ACL 52E, depending on whether the packet is a unicast or multicast packet, respectively. Finally, IP packets are processed using a application ACL that applies rules relating to the application to which the packets belong.

The schemes of FIGS. 4 and 5 are example cascading schemes, which are chosen purely for the sake of conceptual clarity. In alternative embodiments, any other suitable cascading scheme can be used. Alternatively to using NEXT fields, circuitry 36 may use any other suitable cascading mechanism in RDT 48 for cascading ACLs.

The cascading mechanism shown in FIGS. 4 and 5 enables circuitry 36 (and thus the user) to define cascaded ACL schemes in a flexible and efficient manner. As can be seen in the examples above, different packet types may be subjected to different cascades of ACLs by properly configuring the RDT. Moreover, since the cascading mechanism is implemented by looping back to additional RDT entries, there is no bound on the number of ACLs that can be cascaded. In other words, any desired number of sequential ACL lookups can be implemented by proper configuration of the RDT. The number of ACL lookups (i.e., the number of ACLs in the cascade) need not be defined in advance, and can be configured by circuitry 36 (and thus by a user) as needed.

Figure 6:
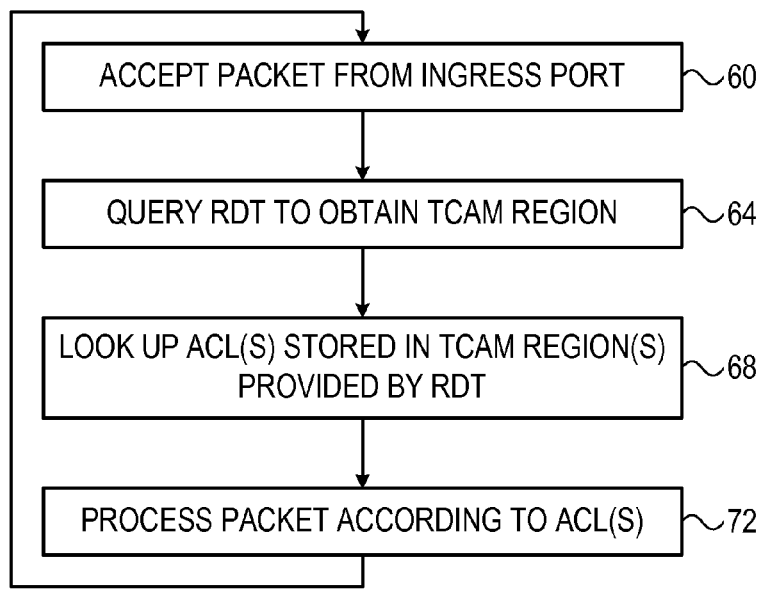
FIG. 6 is a flow chart that schematically illustrates a method for TCAM-based packet processing, in accordance with an embodiment of the present invention.

FIG. 6 is a flow chart that schematically illustrates a method for TCAM-based packet processing, in accordance with an embodiment of the present invention. The method begins with packet processing circuitry 36 accepting a communication packet over a certain ingress port 32, at an input step 60. Circuitry 36 queries RDT 48 to obtain the region 44 in TCAM 40, which holds the ACL that is to be applied to the packet, at an RDT querying step 64. Circuitry 36 looks-up the ACL in question, at an ACL lookup step 68, and processes the packet in accordance with the action specified in the ACL, at a packet processing step 72. When ACL cascading is used, as in the examples of FIGS. 4 and 5, circuitry 36 queries multiple ACLs and processes the packet using the multiple ACLs.

In alternative embodiments, circuitry 36 implements cascading of ACLs using the ACL rules. In these embodiments, a given ACL entry in TCAM 40 may specify that the applicable action is to loop back to a certain RDT entry in order to apply an additional ACL.

Figure 7:
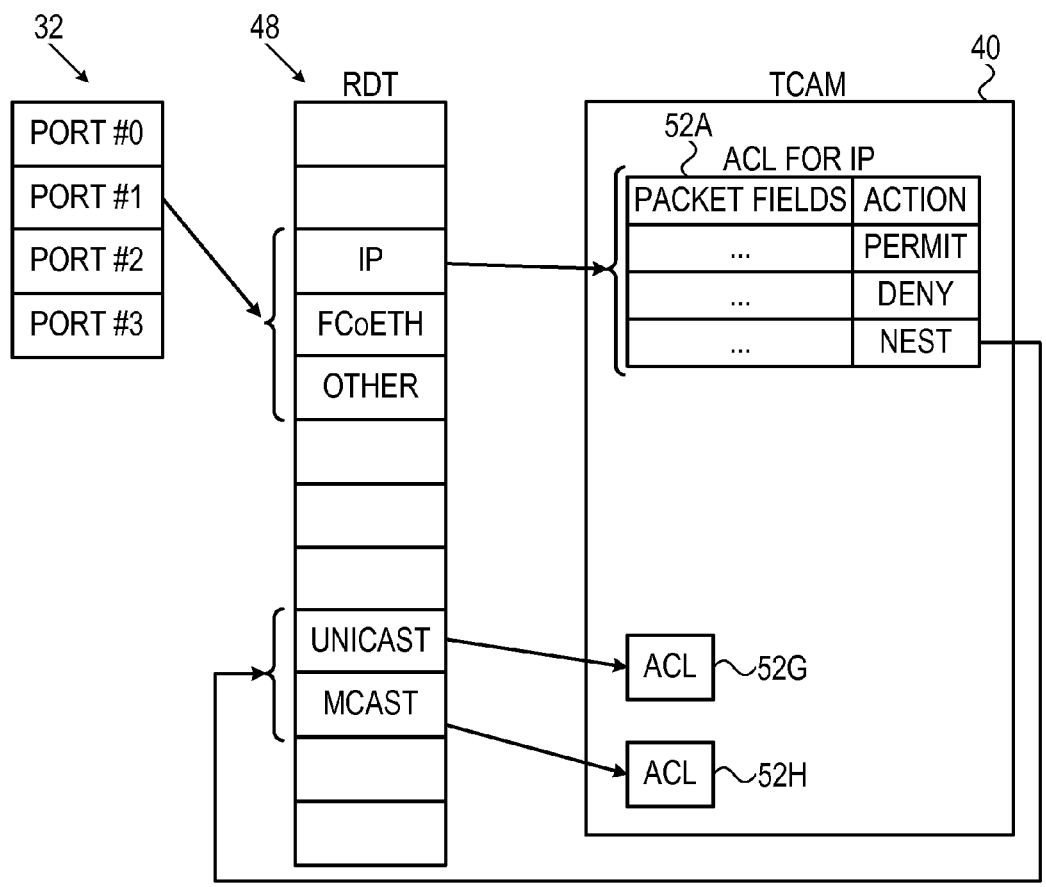
FIG. 7 is a diagram that schematically illustrates another method for cascading ACLs, in accordance with an alternative embodiment of the present invention.

FIG. 7 is a diagram that schematically illustrates another method for cascading ACLs, in accordance with an alternative embodiment of the present invention. In this example, RDT 48 specifies that IP packets entering the switch at port #1 are to be processed using ACL 52A.

ACL 52A, stored in TCAM 40, is shown in greater detail on the right hand side of the figure. Each entry of ACL 52A specifies a certain set of packet header field values, and an action to be applied to packets having these values. Possible actions are to permit or deny forwarding of the packet. In the present example, the applicable action for one or more of the ACL entries is denoted NEST. The NEST action points back to a certain entry in RDT 48. In this embodiment, the NEST entry points to an RDT entry that points to a unicast ACL 52G and a multicast ACL 52H. Thus, when processing an IP packet that matches this entry of ACL 52A, circuitry 36 is instructed to apply ACL 52G if the IP packet is a unicast packet, and to apply ACL 52H if the packet is a multicast packet.

In various embodiments, circuitry 36 may apply cascading of ACLs using either the scheme of FIG. 4 (NEXT fields in the RDT) or using the mechanism of FIG. 7 (NEST actions in the TCAM ACL entries). The scheme of FIG. 7 is sometimes preferable, because the TCAM ACL rules allow high flexibility and fine granularity in defining packet flows for which ACL cascading is to be applied. As a result, ACL processing can be applied only to the exact packet flows for which it is needed, thus reducing unnecessary processing.

Although the embodiments described herein mainly address TCAM-based processing of ACLs in network elements, the methods and systems described herein can also be used in various other applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A communication apparatus, comprising:
a content-Addressable Memory (CAM) storing in respective regions multiple Access Control Lists (ACLs) that are defined for respective packet types, wherein entries of at least one ACL, include an indication of a further ACL to which matching packets are to be applied; and
packet processing circuitry, which is configured to receive input communication packets, to classify each received input packet to a respective packet type, to identify a region of the CAM holding an ACL defined for the selected packet type, and to process the input packet in accordance with a matching entry in the ACL stored in the identified region, wherein when the matching entry indicates a further ACL to be applied to the packet, the packet processing circuitry processes the input packet in accordance with a matching entry in the further ACL,
wherein the entries of a first one of the ACLs have a next field with indications of further ACLs to be applied and the entries of a second one of the ACLs do not have a next field.

2. The apparatus according to claim 1, wherein the CAM comprises a Ternary CAM (TCAM).

3. The apparatus according to claim 1, wherein the packet processing circuitry is configured to store in a data structure external to the CAM respective entries that point to the regions defined for the packet types, and to identify the region holding the ACL defined for the selected packet type by querying an entry of the data structure corresponding to the selected packet type.

4. The apparatus according to claim 3, wherein the packet processing circuitry is configured to configure the data structure or the CAM to apply two or more of the ACLs in cascade to one or more of the input communication packets.

5. The apparatus according to claim 3, wherein the packet processing circuitry is configured to configure the data structure or the CAM to refrain from applying any of the ACLs to one or more of the input communication packets.

6. The apparatus according to claim 1, wherein the packet processing circuitry is configured to receive the input packet over a given ingress port, and wherein the multiple ACLs are associated with the ingress port.

7. The apparatus according to claim 1, wherein the input packet is associated with a given Virtual Local Area Network (VLAN), and wherein the multiple ACLs are associated with the VLAN.

8. The apparatus according to claim 1, wherein the packet processing circuitry is configured to access first and second ACLs defined respectively for first and second packet types using respective first and second keys having different lengths.

9. The apparatus according to claim 1, wherein the packet processing circuitry is configured to access first and second ACLs defined respectively for first and second packet types using respective first and second keys of the same length.

10. A method for communication, comprising:
storing in respective regions of a Content-Addressable Memory (CAM) multiple Access Control Lists (ACLs) that are defined for respective packet types, wherein entries of at least one ACL, include an indication of a further ACL to which matching packets are to be applied;
classifying an input packet to a respective packet type selected from a plurality of packet types;
identifying a region holding an ACL defined for the selected packet type; and
processing the input packet in accordance with a matching entry in a first ACL stored in the identified region, the processing including accessing an entry matching the input packet in a second ACL, the identity of which was indicated in the matching entry of the first ACL, wherein the entries of a first one of the ACLs have a next field with indications of further ACLs to be applied and the entries of a second one of the ACLs do not have a next field.

11. The method according to claim 10, wherein the CAM comprises a Ternary CAM (TCAM).

12. The method according to claim 10, and comprising storing in a data structure external to the CAM respective entries that point to the regions defined for the packet types, wherein identifying the region comprises querying an entry of the data structure corresponding to the selected packet type, so as to identify the region holding the ACL defined for the selected packet type.

13. The method according to claim 12, wherein storing the entries comprises configuring the data structure or the CAM to apply two or more of the ACLs in cascade to packets of one or more packet types.

14. The method according to claim 12, wherein storing the entries comprises configuring the data structure or the CAM to refrain from applying any of the ACLs to packets of one or more packet types.

15. The method according to claim 10, wherein the multiple ACLs are associated with an ingress port over which the input packet is received.

16. The method according to claim 10, wherein the multiple ACLs are associated with a Virtual Local Area Network (VLAN) with which the input packet is associated.

17. The method according to claim 10, and comprising accessing first and second ACLs defined respectively for first and second packet types using respective first and second keys having different lengths.

18. The method according to claim 10, and comprising accessing first and second ACLs defined respectively for first and second packet types using respective first and second keys of the same length.

* * * * *